Oct. 12, 1948.                     J. DOLZA ET AL                    2,451,204
                                   ENGINE CONTROLLER
Filed Aug. 17, 1943                                              8 Sheets-Sheet 1
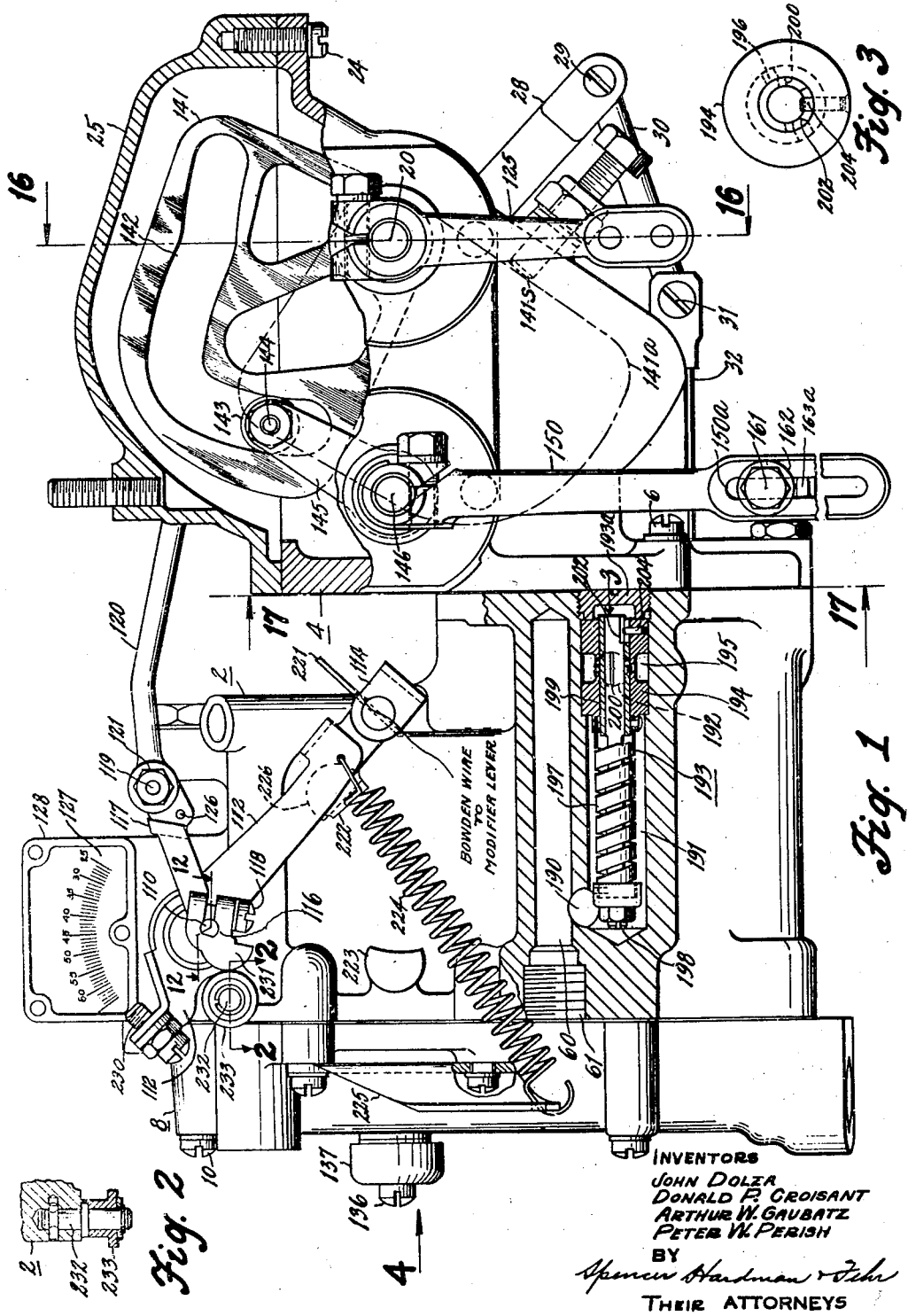
INVENTORS
JOHN DOLZA
DONALD P. CROISANT
ARTHUR W. GAUBATZ
PETER W. PERISH
BY
Spencer Hardman & Fehr
THEIR ATTORNEYS

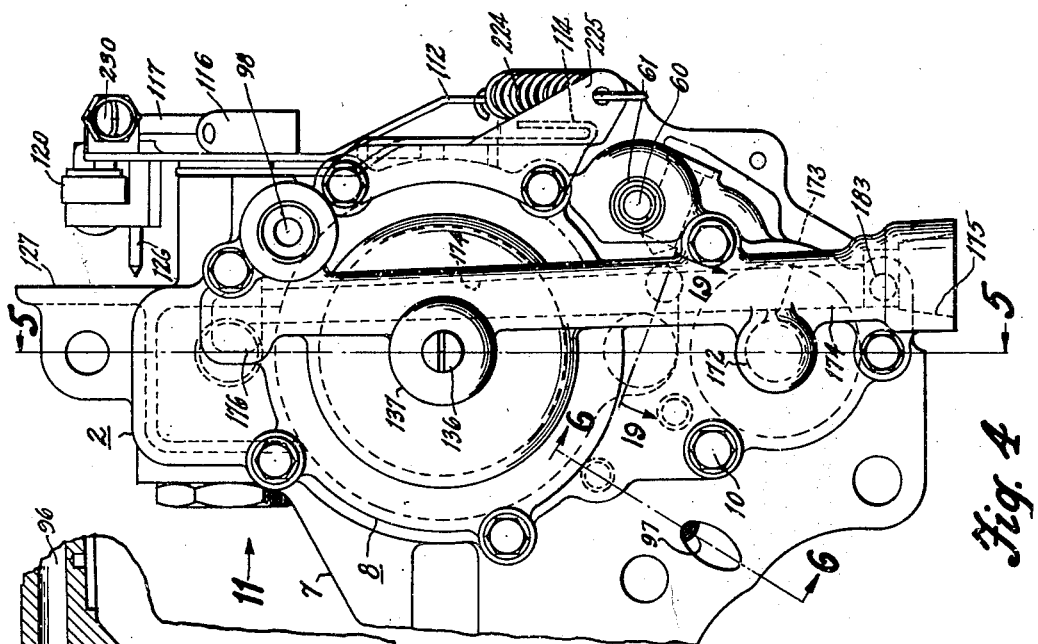

Oct. 12, 1948.   J. DOLZA ET AL   2,451,204
ENGINE CONTROLLER
Filed Aug. 17, 1943   8 Sheets-Sheet 3
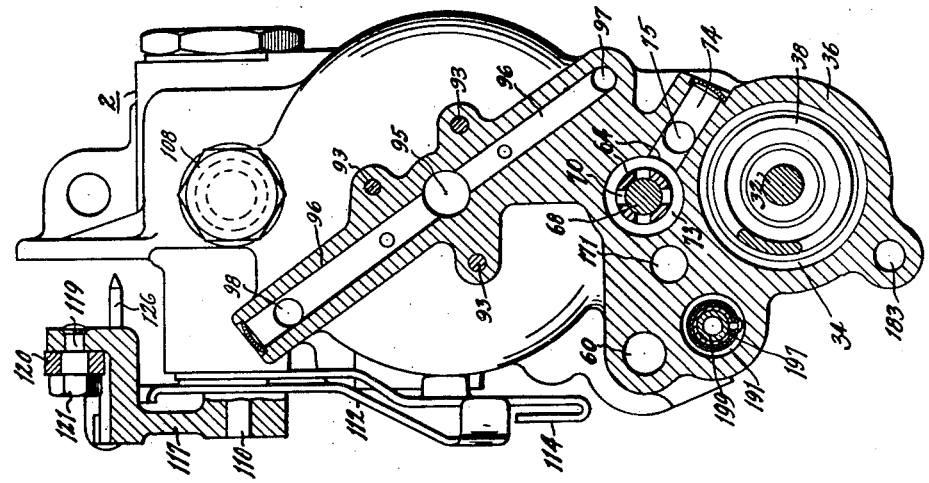
Fig. 9
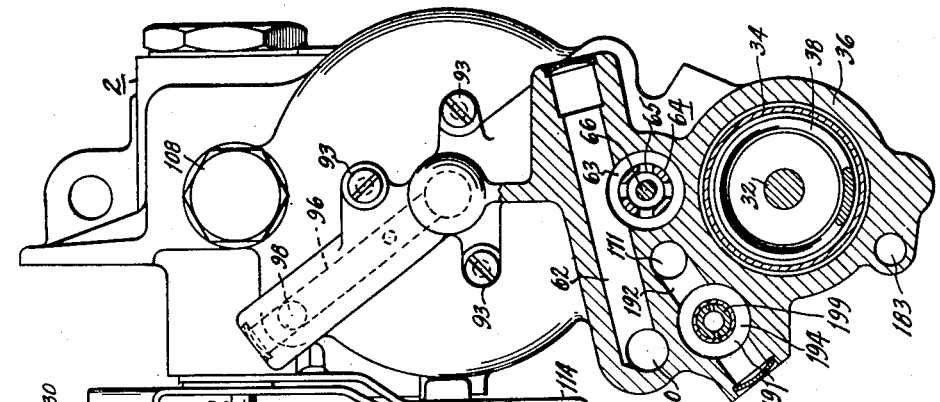
Fig. 8
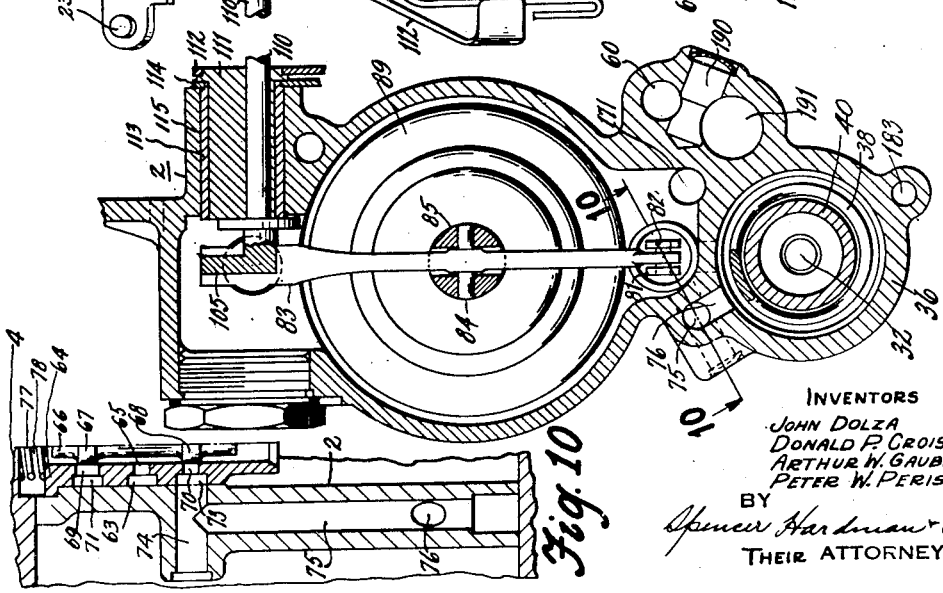
Fig. 7
Fig. 10
INVENTORS
JOHN DOLZA
DONALD P. CROISANT
ARTHUR W. GAUBATZ
PETER W. PERISH
BY
Spencer Hardman & Feher
THEIR ATTORNEYS

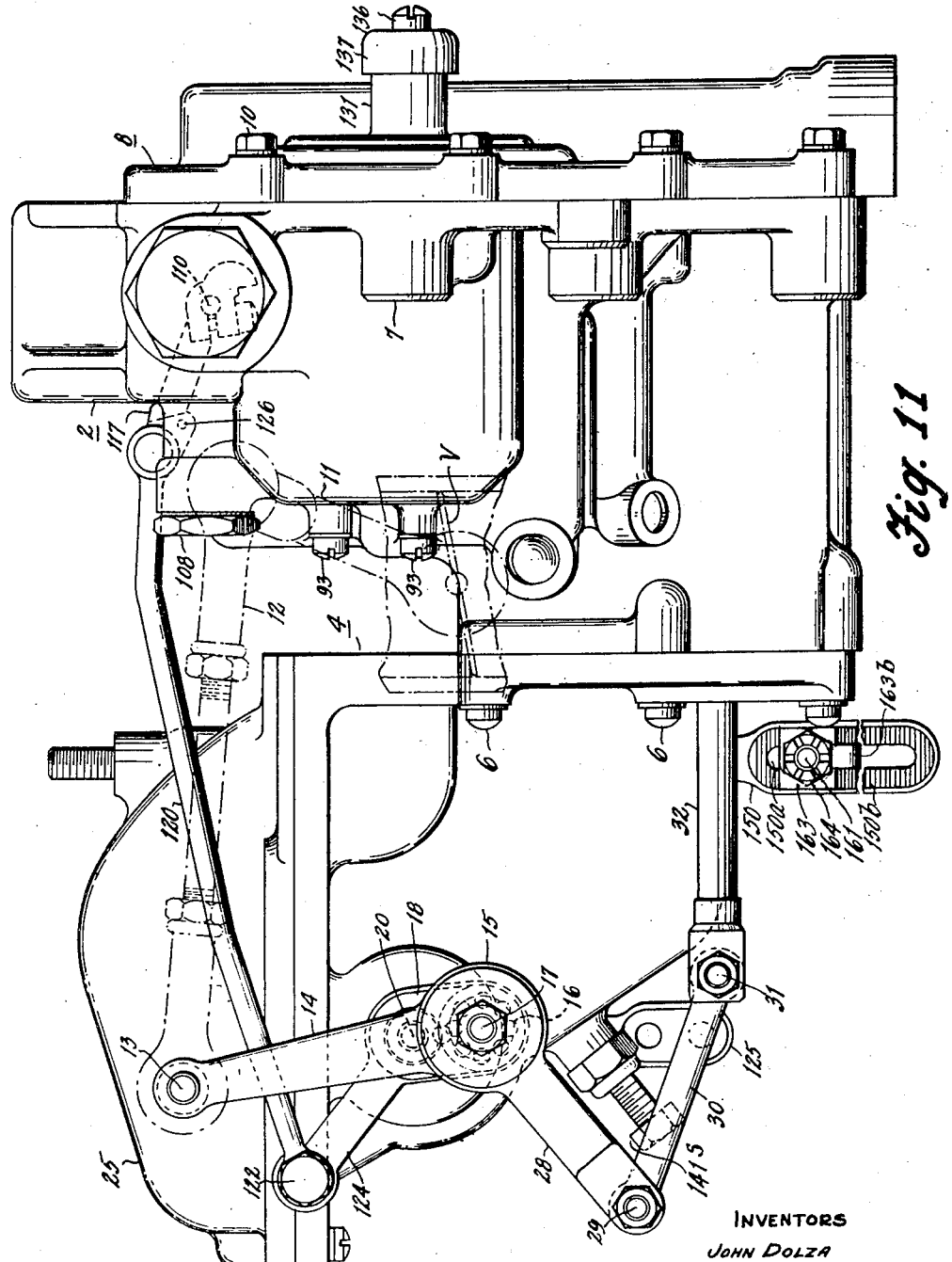

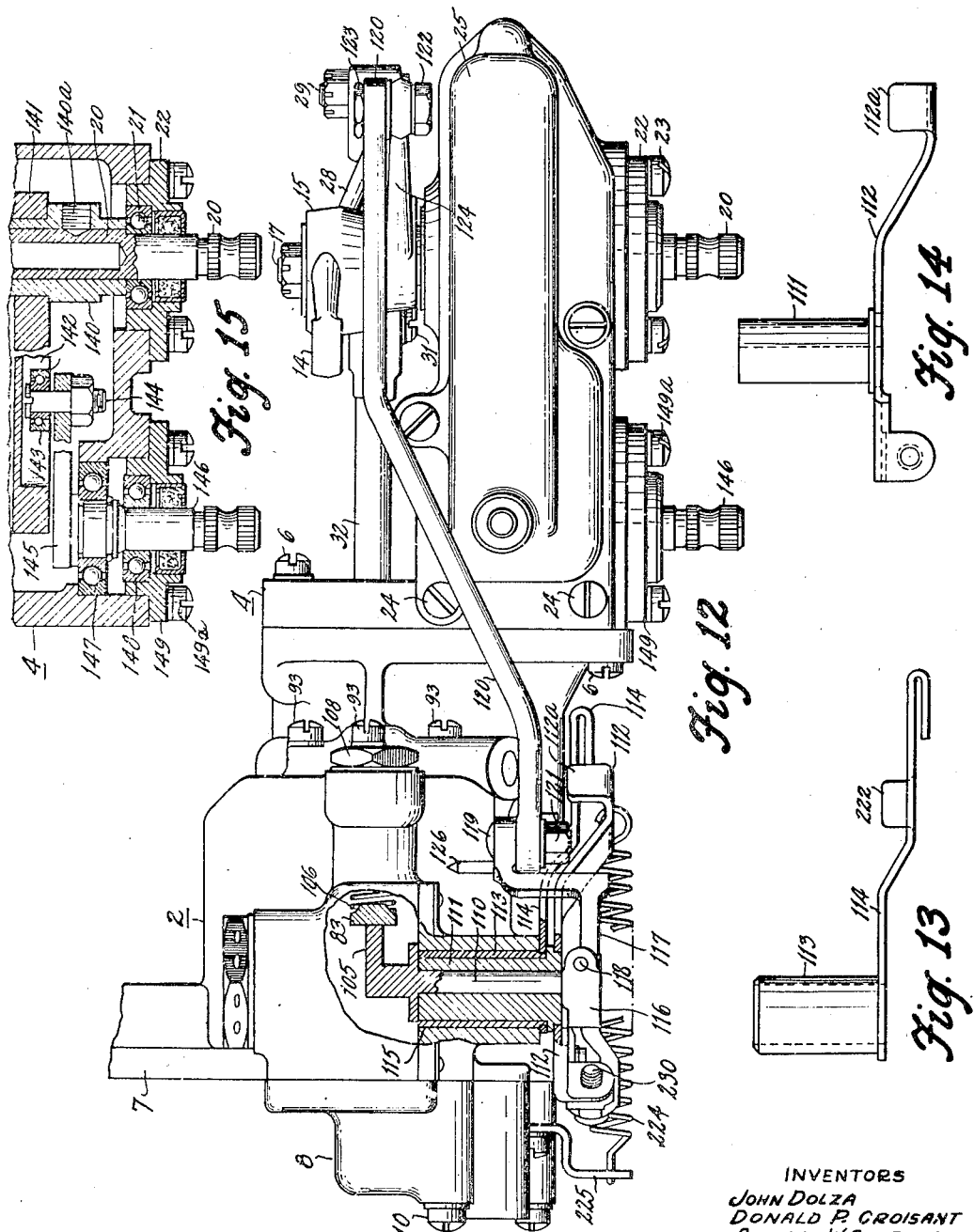

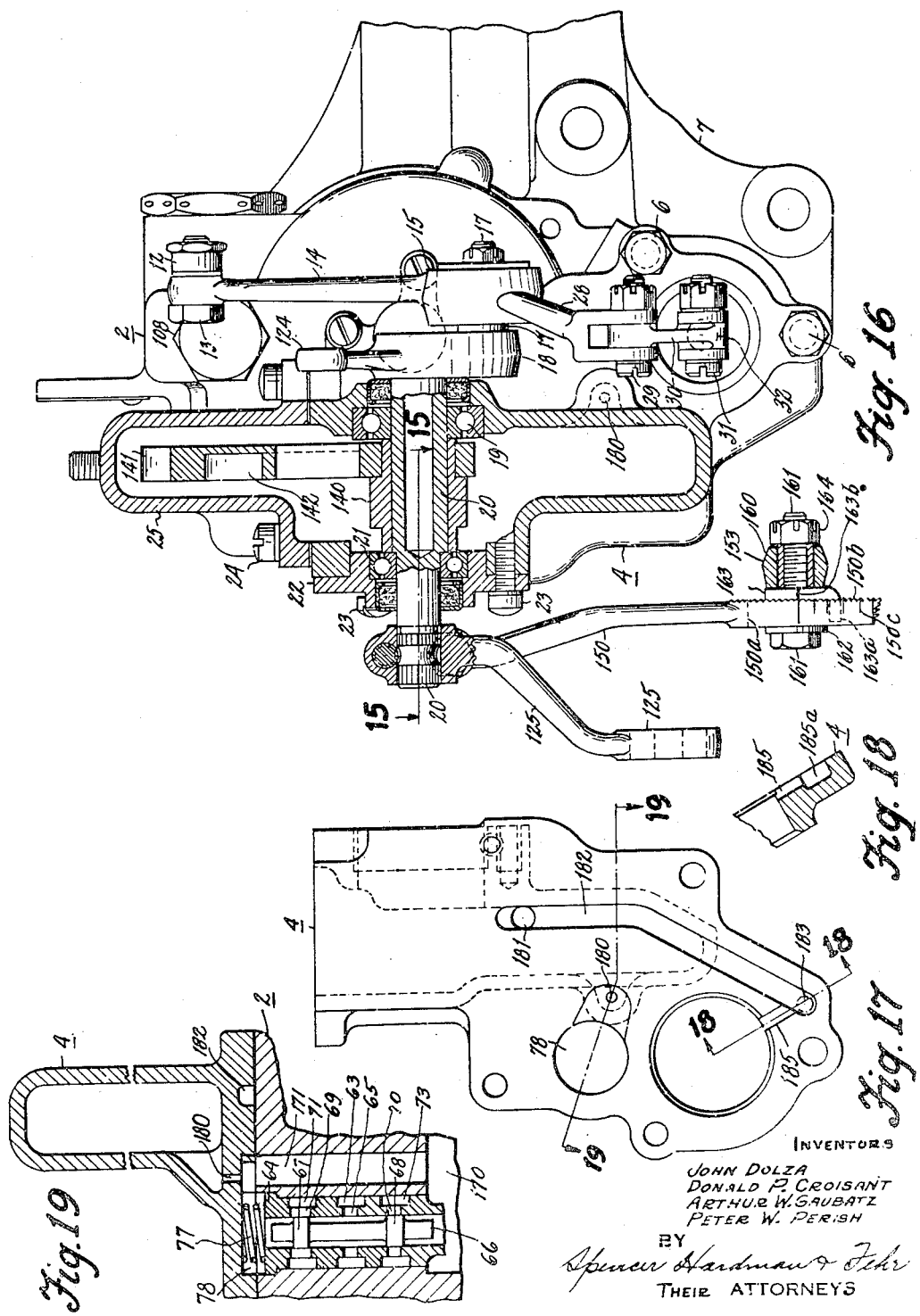

Oct. 12, 1948.   J. DOLZA ET AL   2,451,204
ENGINE CONTROLLER
Filed Aug. 17, 1943   8 Sheets-Sheet 7
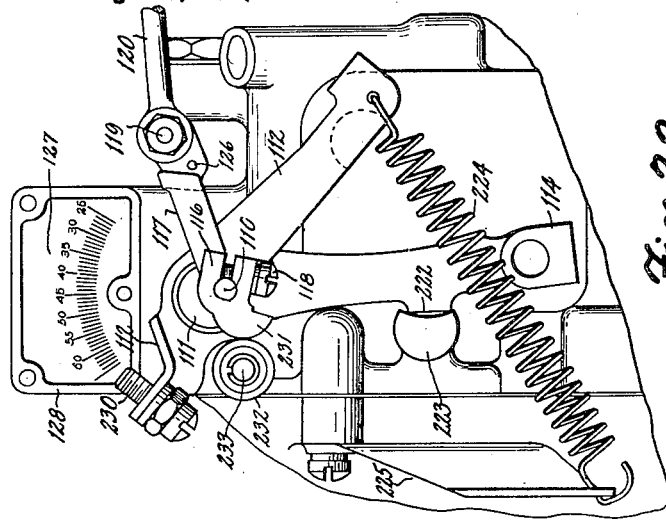
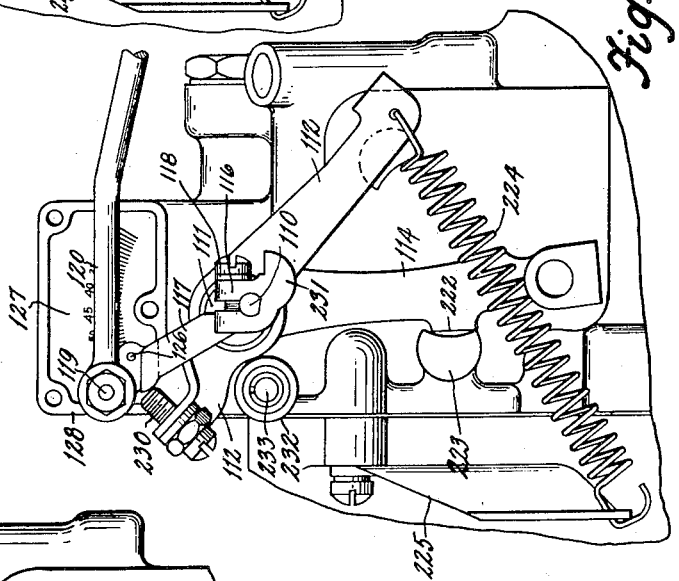
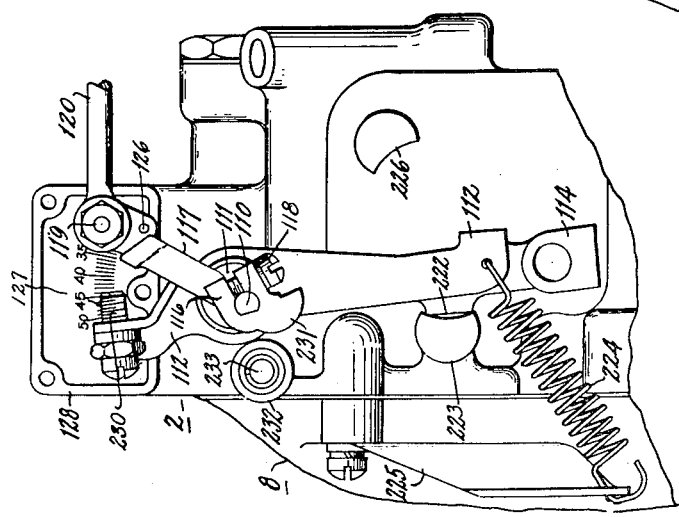
INVENTORS
JOHN DOLZA
DONALD P. CROISANT
ARTHUR W. GAUBATZ
PETER W. PERISH
BY
Spencer Hardman & Fehr
THEIR ATTORNEYS Oct. 12, 1948.   J. DOLZA ET AL   2,451,204
ENGINE CONTROLLER
Filed Aug. 17, 1943   8 Sheets-Sheet 8

INVENTORS
JOHN DOLZA
DONALD R. CROISANT
ARTHUR W. GAUBATZ
PETER W. PERISH
BY
THEIR ATTORNEYS

Patented Oct. 12, 1948

2,451,204

UNITED STATES PATENT OFFICE 2,451,204

ENGINE CONTROLLER

John Dolza, Donald P. Croisant, Arthur W. Gaubatz, and Peter W. Perish, Indianapolis, Ind., assignors to General Motors Corporation, Detroit, Mich., a corporation of Delaware Application August 17, 1943, Serial No. 498,968

19 Claims. (Cl. 123—103)

1

This invention relates to automatic controllers for aircraft engines, one example of which is disclosed in the copending application of Dolza et al., Serial No. 449,918, filed July 6, 1942. That controller comprises a pressure regulator which is manually controlled by a single main control lever operated by the pilot for setting the pressure regulator to maintain a selected manifold pressure with changing altitude, and means set by the control lever for controlling the setting of the propeller governor whereby a certain engine or propeller R. P. M. is selected in coordinated relation to the selection of manifold pressure. Hence there is a predetermined schedule of pressure and corresponding speeds. In effect, the controller provides a predetermined schedule of power output corresponding to various positions of the main control lever.

One object of the present invention is to provide means controlled by the pilot for modifying the power schedule corresponding to the positions of the main control lever without changing the setting of that lever. For example, when ferrying an airplane more power may be required than the regular schedule calls for. Therefore, the present invention provides for so modifying the schedule that increased power may be obtained without changing the setting of the control lever. The disclosed embodiment provides for increasing the pressure selection within certain limits of the regular schedule so that the brake mean effective pressure (B. M. E. P.) of the engine will be increased to give the additional power while the setting of the main control lever is not changed. Hence the schedule of B. M. E. P. and speed can be altered at will by the pilot or returned to the regular schedule by operating an auxiliary lever. In this connection a further object is to provide automatically for the return to the regular schedule of pressure in case the pilot moves the main control lever to certain positions and fails to return to regular schedule by moving the auxiliary lever to normal or non-controlling position. The certain positions referred to are, for example, the "idle" and "emergency" settings of the main control lever, since it is desired that the regular schedule be adhered to in all events when the engine is idling or when emergency power is required.

Another object is to simplify the construction and improve the durability of the mechanism operated by the main control lever for controlling the propeller governor.

Further objects and advantages of the present invention will be apparent from the following

2 description, reference being had to the accompanying drawings wherein a preferred embodiment of the invention is clearly shown.

In the drawings:

Fig. 1 is a side elevation of the controller with parts of the housing in section;

Fig. 2 is a fragmentary sectional view on line 2—2 of Fig. 1;

Fig. 3 is an enlarged scale view of an end of a temperature responsive valve, looking in the direction of arrow 3 of Fig. 1;

Fig. 4 is an end view taken in the direction of arrow 4 of Fig. 1;

Figure 23:
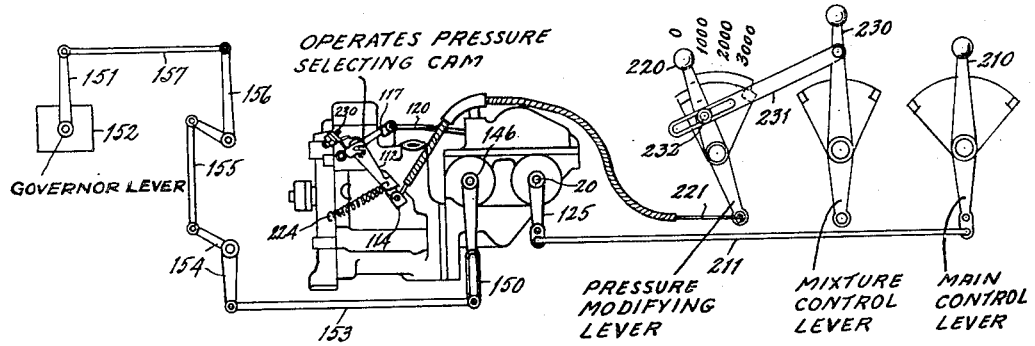
Figure 24:
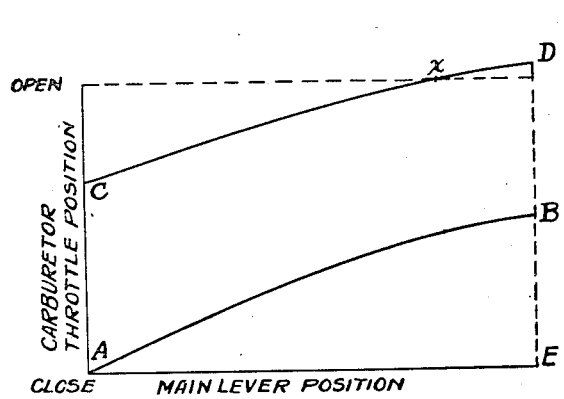
Figure 25:
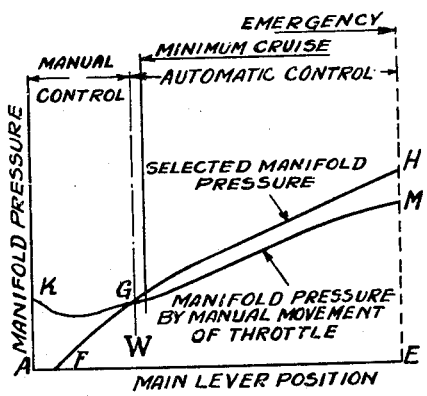
Figure 26:
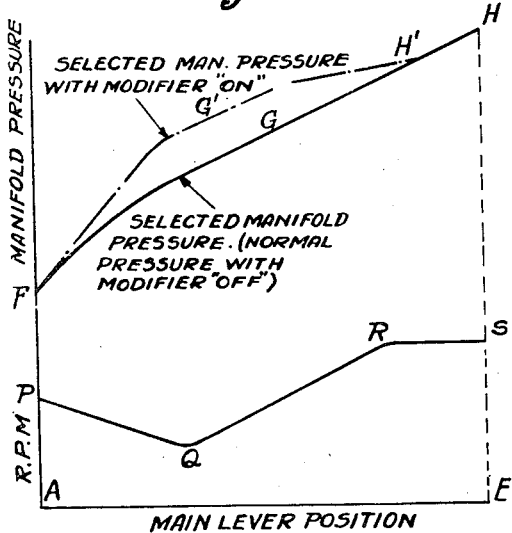

Figs. 5 and 6 are sectional views taken, respectively, on lines 5—5 and 6—6 of Fig. 4;

Figs. 7, 8 and 9 are sectional views taken, respectively, on lines 7—7, 8—8 and 9—9 of Fig. 5;

Fig. 10 is a fragmentary sectional view on line 10—10 of Fig. 7;

Fig. 11 is a side elevation in the direction of arrow 11 of Fig. 4;

Fig. 12 is a plan view partly in section, the section being taken on line 12—12 of Fig. 1;

Figs. 13 and 14 are separate views of levers, the hubs of which are shown in section in Fig. 12;

Fig. 15 is a fragmentary sectional view on line 15—15 of Fig. 16;

Fig. 16 is an end view partly in section, the section being taken on line 16—16 of Fig. 1;

Fig. 17 is a view of one of the housing members taken on line 17—17 of Fig. 1;

Figs. 18 and 19 are sectional views taken respectively on lines 18—18 and 19—19 of Fig. 17; and Fig. 19 includes a fragmentary sectional view on line 19—19 of Fig. 4;

Figs. 20, 21 and 22 are fragmentary side views of parts shown in Fig. 1, these parts being shown in different positions;

Fig. 23 is a diagram of connections between the controller, the cockpit throttle and modifier levers, the throttle valve and the speed governor;

Fig. 24 is a chart showing relation of main lever positions to manually effected throttle position and to throttle position effected by manual and automatic operation of the controller;

Fig. 25 is a chart showing relation of main lever position to selected manifold pressure; and Fig. 26 is a chart showing relation of main lever position to R. P. M. and to manifold pressure, with the pressure schedule modifier on and off.

The framework of the device comprises two housings indicated generically by the reference numbers 2 and 4 which are secured together in any suitable way, as by bolts 6. The housing 2 is provided with mounting plate 7 adapted to be secured to the engine or to some other suitable supporting means. The pressure operated mechanism for controlling the position of the throttle valve is located within the housing 2 and the mechanism for controlling the engine or propeller R. P. M. is located within the housing 4, these mechanisms operating to position the several instrumentalities controlled thereby through the medium of a system of levers principally located outside the two housings and supported thereby. Referring to Fig. 5 it will be noted that screws 10 secure to the housing 2 end plate or head 8 in which certain fluid passages are formed, for a purpose later set forth.

Referring to Figs. 11 and 23, the carburetor throttle valve V is rotated by an arm 11 connected by a link 12 with the stud 13 of a differential bell crank lever 14. The lever 14 is enlarged to form a hub 15 to receive the outer race of a ball bearing 16, the inner race of which is supported by a stud 17 carried by an arm 18 which is secured to a shaft 20 which extends through the housing 4 and is supported by bearings 19 and 21 carried by the housing 4 and a plate 22 attached by screws 23. Screws 24 secure to housing 4 a cover 25.

The lower end 28 of the lever 14 (Fig. 11) is pivotally connected at 29 with a link 30 pivotally connected at 31 with a piston rod 32 attached in any suitable manner to a piston 34 (Fig. 5) slidable in a cylinder 36 formed in the housing 2. The piston 34 is normally held in the position shown in Fig. 5 by a spring 38 located between the piston 34 and a cylinder head 40 which is fixed in one end of the cylinder 36 and has a sleeve 42 formed at the center thereof to provide a bearing in which one end of the piston rod 32 slides. Another cylinder head 44 is located in the opposite end of cylinder 36 and provides an annular extension 46 received by a hole 48 in housing 4. The cylinder head 44 has a centrally disposed annular extension 52 in which is received a bushing 54 which provides a second bearing for the piston rod 32. A suitable seal 56 is supported within the extension of head 44 to prevent any leakage of fluid around the piston rod.

The piston 34 and cylinder 36 constitute a servo-motor for automatically operating the differential lever 14 to move the throttle valve V of the carburetor. Oil pressure as controlled by an automatic valve, provides the motive power for moving the piston. To effect movement of the piston 34, oil under pressure is supplied to a passage 60 (Figs. 1, 7, 8 and 9) provided by housing 2 from an oil pressure source connected at 61 (Figs. 1 and 4). Passage 60 leads to passage 62 (Figs. 5 and 8) connected with an annular groove 63 in a tubular valve guide 64 connected with the interior thereof by a plurality of ports 65 located in an annular row. Guide 64 supports a valve 66 having lands 67 and 68 which control connection between ports 65 and either of the groups of valve guide ports 69 and 70, each group being a plurality of ports as shown in Fig. 8. One of the ports 69 is wider than land 67 to provide for restricted circulation of oil through the controller even when land 67 is located as shown in Fig. 5. Ports 69 lead to valve guide groove 71 leading through passage 72 to the right side of piston 34. Ports 70 lead to valve guide groove 73 leading through passages 74, 75 and 76 (Fig. 10) to the left side (Fig. 5) of piston 34. A spring 77 located in a pocket 78 between housings 2 and 4 urges the guide 64 against a shoulder 79 provided by housing 2.

Valve 66 is connected by rod 80, clevis 81 and pin 82 with a lever 83 pivoted on a pin 84 carried by a bridge 85 connecting movable end plates 86 and 87 of metal bellows 88 and 89, respectively, having relatively fixed end plates 90 and 91, respectively. Screws 93 secure the plate 91 to housing 2 with a sealing gasket 92 between them. The interior of bellows 89 is connected either with a supercharger housing or scroll or with the engine intake manifold through apertured disc 94 (carried by plate 91), pocket 95, cross passage 96 (Fig. 5) and either of two passages 97 and 98. If connection with the scroll is to be made, use passages 97 (Fig. 6) and plug the end of passage 98 (Fig. 4); or, if connection with the engine intake is to be made, connect passage 98 with the intake manifold and plug passage 97. Bellows 88 is evacuated so that the bellows system is compensated for changes in atmospheric pressure. It is responsive only to changes in engine intake pressure. Spring 100 in bellows 89 and springs 101 and 102 in bellows 88 are so constructed and calibrated that the relation of the movements of the pin 84 to changes in engine intake pressure is substantially a fixed linear relation.

The location of valve 66 is determined partly by the pressure within bellows 89 and partly by a pressure selecting cam 105 against which the upper end of lever 83 is urged by a spring 106 located in a recess 107 provided by housing 2 and retained by a plug 108. Cam 105 is attached to a shaft 110 which is journaled in the hub 111 of a lever 112 (Fig. 14) which is journaled in the hub 113 of a lever 114 (Fig. 13) which is journaled in the bore 115 (Fig. 12) of housing 2. The hubs 111 and 113 are concentric, but shaft 110 is eccentrically supported by hub 111 for a purpose to be described. Shaft 110 is gripped by the clamping hub 116 of a lever 117, the hub being tightened by a clamping screw 118. Stud 119 fixed to lever 117 provides a pivotal connection with a link 120 which is retained upon the stud 119 by a nut 121. Link 120 is connected by a screw 122 (Figs. 11 and 12) retained by nut 123, with a lever arm 124 integral with arm 18 (Fig. 11) which through the shaft 20 is manually operated by a lever 125 known as the main control lever. The location of selector cam 105 by the main control lever 125 operating through the lever 117 selects pressures such as from 25 to 65 inches of mercury, absolute, for example which are indicated by a pointer 126 which moves past graduations 127 on a dial plate 128 carried by housing 2.

The device is calibrated by moving lever 117 to indicate the most important pressure, for example, war emergency pressure 60" Hg. That same pressure is applied in bellows 89. An adjustment of the pin 84 is made until the piston 34 is in a balanced condition, that is, floating and not touching either end of the cylinder. In order to adjust the location of pin 84 the bellows plate 90 has a stem 130 received by a tubular boss in the plate 8 and which provides a tapped hole 132 for receiving an adjustable stop screw 133 having a screw driver blade slot 134 and locked by a nut 135. Screw 133 has a plain central bore receiving a screw 136 which retains a cover cup 137 and which threads into the stem 130 of plate 90 and which will draw the stem against the stop screw 133. To make the adjustment, remove the screw 136 and cover 137, loosen nut 135, apply oil pressure at passage 60. If piston 34 moves inwardly to left position in cylinder 36, turn screw 133 out until the piston 34 just begins to move right. This will indicate that the valve lands 67 and 68 have moved slightly to the left of the ports 69 and 70. Turn screw 133 slightly in the opposite direction until movement of piston ceases. This calibration should take place while the controller is being vibrated in order to cancel out frictional hysteresis. If, instead of moving piston inwardly when the oil pressure is applied in passage 60, the piston 34 stays in the outward position, shown in Fig. 5, the screw 133 is turned inwardly until the piston starts moving to the left. Then the screw is turned slightly outwardly until movement of the piston ceases. After the adjustment is made, nut 135 is tightened and cover 137 and screw 136 are replaced and sealed.

The functions of the main control lever 125 are to control the throttle valve V sufficiently to make a take off or to make a safe landing in case of failure of oil pressure in the controller servomotor, to move cam 105 to select the intake pressure to be maintained, and to control engine speed in coordinated relation to pressure selection. This latter function is performed by a mechanism operated by shaft 20 to which the lever 125 is connected. Referring to Figs. 1, 15 and 16, shaft 20 drives the hub 140 of a cam plate 141 having a cam slot 142 which receives a ball bearing follower 143, the inner race of which is attached by a screw 144 to an arm 145 driving a shaft 146 journaled in bearings 147 and 148 mounted respectively in housing 4 and plate 149 attached to housing 4 by screws 149a (Fig. 12). Lever 150 (Fig. 23), driven by shaft 146, is connected in any suitable manner with control lever 151 of a propeller governor indicated diagrammatically at 152. For example, lever 150 may be connected by a link 153 with a bell-crank lever 154 connected by a link 155 with a bell-crank lever 156 connected by a link 157 with lever 151. The amount of motion transmitted by lever 150 to lever 151 may be varied according to the distance between the shaft 146 and the connection between lever 150 and link 153. As shown in Figs. 1 and 16, link 153 pivots on a bearing sleeve 160 surrounding a screw 161 which passes through a plain washer 162, a slot 150a in lever 150 and a rectangular washer 163 having serrations mating with serrations 150b of lever 150 and having a lug 163a received by the slot 150a of lever 150. Lug 163 has an index mark 163b cooperating with graduations 150c on the side of lever 150. When the nut 164 is loosened sufficiently to free the serrations of washer 163 from the serrations 150b of lever 150, the screw 161 can be moved up or down to locate the mark 163b opposite the selected graduation mark on the side of lever 150. Then the nut 164 is tightened to secure the screw 161 in the desired position of adjustment along the lever 150.

Cam plate hub 140 (Fig. 15) is connected with shaft 20 by a set screw 140a. The cam plate and its hub may be removed and replaced by a cam plate having a different cam groove which will provide a different schedule of relations between selected pressure and governed engine speeds.

During operation of the controller the housing 4 contains oil into which the cam plate 141 dips as it is moved by the lever 125; and a bellows chamber 170 (Fig. 5) in housing 2 contains oil in order to dampen vibration of the bellows. Oil for these purposes is principally that which is discharged from the servo cylinder 36. When valve 66 is moved to the right from the position shown in Fig. 5 to connect ports 65 and 69 in order that the piston 34 will move left, the oil on the left side of the piston will be discharged through passages 76, 75, 74 (Fig. 10), groove 73 (Fig. 5) and through the guide 64 to the chamber 170. When valve 66 moves left from the position shown to connect ports 65 and 70, oil at the right of the piston 34 is discharged through passage 72, groove 71, guide 64, pocket 78, a passage 171 (connected with pocket 78 as shown in Fig. 19) and into chamber 170. Chamber 170 drains into a pocket 172 in plate 8 connected by a restricting hole 173 with a drain 174 (Fig. 4) with which a pipe may be connected at 175. During operation of the controller, oil rises in the chamber 170 and overflows through passage 176 and passes down the drain 174. Some of the oil received by pocket 78 flows through a small hole 180 (Fig. 19) in housing 4. The level of oil in housing 4 will rise during operation and the excess will overflow through a hole 181 (Fig. 17) and down a channel 182 which communicates with a passage 183 in housing 2 which leads to drain 174 (Fig. 4). Oil trapped by the oil seal 56 (Fig. 5) flows through a hole 184 in part 46 and through a groove 185 of housing 4 (Fig. 17) connecting with the groove 182.

Generally the leakage of oil past the land 67 and through the oversize port 69 (Fig. 5), when valve 66 is in the normal position shown, will provide for oil circulation at a rate sufficient to avoid congealing of the oil and allow oil to circulate to provide for immediate operation when the engine is cold. However, if the foregoing procedure should prove inadequate, a temperature controlled oil by-pass can be provided. As shown in Figs. 1, 7, 8 and 9, high pressure oil inlet passage 60 is connected by passages 190, 191, 192 and 171 with bellows chamber 170. This by-pass is controlled by a thermostat valve 193 secured by plug 193a and comprising a body 194 having a groove 195 adjacent the passage 192 and having ports 196 extending through the grooved portion of the body. The body 194 is attached to one end of a bimetallic spiral 197 having its other end attached to the stem 198 of a rotary valve 199 having ports 200 for controlling oil flow through the ports 196 of body 194. Rotation of valve 199 is limited by a stop pin 204 attached to body 194 and received by a notch 202 in the valve 199. When the oil is cold, the by-pass is opened by ports 200 of valve 199 registering with the ports 196 of body 194. While the engine is "warming up," the cold engine oil is first by-passed around the servo control valve 66. As oil temperature increases, the valve 199 closes the by-pass.

When the engine is idling, the valve V and movable parts of the controller will be located as shown in Figs. 1, 5, 11, and 23. The idle position of valve V is indicated at A in Fig. 24. As the lever 125 is moved clockwise in Fig. 11, throttle valve V opens since the differential lever 14 moves left and rotates counterclockwise, the piston rod 32 remaining stationary. Line A—B of Fig. 24 represents the relation of opening of the throttle valve V and movement of lever 125 which is limited in its clockwise rotation (Fig. 11) by the cam plate 141 striking an adjustable stop screw 141S (Fig. 1) supported by the housing 4. The maximum manually effected opening of valve V is B—E which, for example, may be 40° of the total of 80° opening movement of a valve having its idle position 10° from a plane at right angle to the axis of the fuel passage. As lever 125 and arm 18 are moved counterclockwise (Fig. 11) there is movement of pressure selecting cam 105 which is counterclockwise in Fig. 5. The relation of selected pressure to the setting of lever 125 is represented by line F—G—H of Fig. 25. If the controller servo did not operate, the intake pressures actually obtainable at sea level by manually opening the valve V (according to line A—B of Fig. 24) are represented by line K—G—M in Fig. 25. Lines F—G—H and K—G—M intersect at G on vertical line W. Since line K—G is above line F—G it follows that, for all positions of the lever 125 to the left of line W, intake pressure is controlled only by manually moving the throttle V, the servomotor being non-operating with the servopiston in the right position shown in Fig. 5. Since line G—H is above line G—M it follows that, for all positions of the lever 125 to the right of line W, the pressures obtained are not according to line G—M; but they are the selected pressures maintained automatically by the controller. Line K—G represents, by its reversal of curvature, an unstable condition, therefore it would be undesirable for the controller servo to take over control of the throttle until after the range of instability has been passed. To accomplish this cam 105 (Fig. 5) is so shaped that, during movement of lever 125 to the position represented by W in Fig. 25, the valve 66 is kept in such position that the pressure is applied to the left side of piston 34 holding it against the cylinder end 44. Therefore, until position W of lever 125 is reached, there is no automatic control of the throttle. G represents a pressure selection slightly less than required for minimum cruise. After the lever 125 is moved past position W (Fig. 25) then more pressure is called for than can be supplied merely by opening the valve V manually. Then the ports 69 are connected with ports 65, and the piston rod 32 starts moving left in Fig. 5, or right in Fig. 11, to move the valve V to whatever open position is required to maintain the selected pressure. Therefore, in the range of pressure selection from minimum cruise to emergency, the valve 66 is operated automatically to obtain that movement of the servo piston required to open the throttle valve to maintain the selected pressure. During a climb the valve V is opened automatically and during a descent it is closed automatically. Curve C—D of Fig. 24 represents the throttle opening effected by the combination of manual operation A—B and full servo movement. Line C—D passes full throttle opening at X by a slight amount which is permissible since there is no appreciable restriction of air flow. This allows the use of a substantial portion of the C—D curve close to wide-open throttle position. Therefore, over a wide range of pressure selection the throttle is practically wide open at critical altitude.

Under certain conditions as when "ferrying" a plane, it is desirable to change the regular pressure schedule F—G—H to schedule F—G'—H' (Fig. 26). For this purpose the pilot moves a modifier lever 220 in the cockpit clockwise. Motion is transmitted by a flexible cable 221 to lever 114 to cause it to move from the position shown in Fig. 1 to that shown in Fig. 20, wherein lever lug 222 engages a stop lug 223. Since lever 112 is connected by a spring 224 with a bracket 225 supported by the housing 2, lever 112 follows along with lever 114, provided lever 117 is in a position intermediate "idling" and "emergency." Clockwise movement of lever 112 and its hub 111 causes cam 105 (eccentrically supported by hub 111) to move left away from lever 83 to increase the pressure selection, just as counterclockwise rotation of shaft 110 would increase pressure selection. If lever 114 is moved the full distance between stops 226 and 223, the pressure schedule is raised to F—G'—H' of Fig. 26. For lesser movements clockwise of the lever 114, the pressure schedule is raised a correspondingly lesser amount.

The controller provides means for returning automatically to regular schedule F—G—H when the lever 125 is moved either to "idle" or "emergency" pressure selecting positions. When lever 125 is moved to "emergency" as E (Fig. 26) lever 117 operated by lever 125 engages a screw 230 adustably secured to lever 112 and causes it to move from the position shown in Fig. 20 to that shown in Fig. 21 while spring 224 stretches. As lever 125 is moved to "idle" as at A (Fig. 26), a cam 231 on lever 117 presses against a roller 232 pivoted on a stud 233 fastened to housing 2 and forces the axis of shaft 110 back to normal position shown in Figs. 1 and 5, thereby rotating hub 111 and rotating lever 112 to normal position as shown in Fig. 22, while spring 224 stretches.

In Fig. 23, lever 114 is in normal position for zero excess load. It may be moved into position for boosting the pressure selection when the excess load is 1000 lbs., 2000 lbs., 3000 lbs., etc. In Fig. 23 there is shown a fuel mixture control lever 240 which is located in the cock-pit. A lost motion connection comprising slotted link 241 and pin 242 is provided between levers 240 and 220 whereby, when lever 240 is in the mixture setting position for operation of the plane, the lever 220 is free to move throughout its full range and whereby, when lever 240 is moved fully to the left to "idle cut-off" position, lever 220 will be returned to normal or zero excess load position. Therefore, when the engine is stopped by movement of lever 240 to the extreme left, pressure-selection modifier lever will be returned to normal position.

While the embodiment of the present invention as herein disclosed, constitutes a preferred form, it is to be understood that other forms might be adopted, all coming within the scope of the claims which follow.

What is claimed is as follows:

1. Apparatus for controlling the power output of a supercharged internal combustion engine comprising a manually operated member, means adjusted thereby for controlling engine fuel intake pressure, means operated by the manually operated member for adjusting the governed speed of the engine in predetermined relation to the intake pressure whereby a predetermined schedule of relations between the pressure and speed factors of engine power output is maintained with respect to movements of the manually operated member, a second manually operable member, means actuated by movements of the second member from normal position for modifying the schedule of engine power output factors while the first manually operable member remains in set position and means actuated by the movement of the first manually operable member to a certain low pressure position for nullifying the effect of the modifying means while the second manually operable member remains in a position away from normal.

2. Apparatus for controlling the power output of a supercharged internal combustion engine comprising a manually operated member, means adjusted thereby for controlling engine fuel intake pressure, means operated by the manually operated member for adjusting the governed speed of the engine in predetermined relation to the intake pressure whereby a predetermined schedule of relations between the pressure and speed factors of engine power output is maintained with respect to movements of the manually operated member, a second manually operable member, means actuated by movements of the second member from normal position for modifying the schedule of engine power output factors while the first manually operable member remains in set position and means actuated by movements of the first manually operable member to a certain high pressure position for nullifying the effect of the modifying means while the second manually operable member remains in a position away from normal.

3. Apparatus for controlling the power output of a supercharged internal combustion engine comprising a manually operated member, means adjusted thereby for controlling engine fuel intake pressure, means operated by the manually operated member for adjusting the governed speed of the engine in predetermined relation to the intake pressure whereby a predetermined schedule of relations between the pressure and speed factors of engine power output is maintained with respect to movements of the manually operated member, a second manually operable member, means actuated by movements of the second member from normal position for modifying the schedule of engine power output factors while the first manually operable member remains in set position, within a range of low pressure settings and a certain limited range of high pressure settings, means actuated by movements of the first manually operable member to a certain low pressure setting for nullifying the effect of the modifying means while the second manually operable member remains in a position away from normal and means actuated by movement of the first manually operable member to a certain high pressure setting for nullifying the effect of the modifying means while the second manually operable member remains in a position away from normal.

4. Apparatus for controlling the power output of a supercharged internal combustion engine, comprising a throttle valve for controlling the engine fuel intake, a manually operable member for operating the throttle valve, means responsive to fuel intake pressure for so operating the throttle valve as to maintain a selected pressure, means operated by the manually operated member for selecting the pressure to be maintained, means operated by the manually operated member for determining the governed engine speed in predetermined relation to pressure selection whereby movement of the manually operable member controls the pressure and speed factors of engine power output according to a predetermined schedule, a second manually operable member, means actuated by movement of the second manually operable member from a normal position, when the position of the first manually operable member is in a setting above a certain low pressure setting, for modifying the value of one of the engine power factors while the setting of the first manually operable member remains fixed and means operable by the first manually operable member to a certain low pressure position for nullifying the effect of said modifying means while the second manually operable member remains away from normal position.

5. Apparatus for controlling the power output of a supercharged internal combustion engine comprising a throttle valve for controlling the engine fuel intake, a manually operable member for operating the throttle valve, means responsive to fuel intake pressure for so operating the throttle valve as to maintain a selected pressure, means operated by the manually operated member for selecting the pressure to be maintained, means operated by the manually operated member for determining the governed engine speed in predetermined relation to pressure selection whereby movement of the manually operable member controls the pressure and speed factors of engine power output according to a predetermined schedule, a second manually operable member, means actuated by movements of the second manually operable member from a normal position, when the position of the first manually operable member is in a setting below a certain high pressure setting, for modifying the value of one of the engine power factors while the setting of the first manually operable member remains fixed and means operable by the first manually operable member to a certain high pressure position for nullifying the effect of said modifying means while the second manually operable member remains away from normal position.

6. Apparatus for controlling the power output of a supercharged internal combustion engine comprising a throttle valve for controlling the engine fuel intake, a manually operable member for operating the throttle valve, means responsive to fuel intake pressure for so operating the throttle valve as to maintain a selected pressure, means operated by the manually operated member for determining the governed engine speed in predetermined relation to pressure selection whereby movement of the manually operable member controls the pressure and speed factors of engine power output according to a predetermined schedule, a second manually operable member, means actuated by movements of the second manually operable member from a normal position, when the position of the first manually operable member is in a setting above a certain low setting and below a certain high pressure setting, for the value of one of the engine power factors while the setting of the first manually operable member remains fixed, and means operable by the first manually operable member to a certain low pressure position for nullifying the effect of said modifying means while the second manually operable member remains away from normal position and means operable by the first manually operable member to a certain high pressure position for nullifying the effect of said modifying means while the second manually operable member remains away from normal position.

7. Apparatus for controlling the power output of a supercharged internal combustion engine comprising a throttle valve for controlling the engine fuel intake, a manually operable member for operating the throttle valve, a servo motor for operating the throttle valve, a pressure selecting cam, means under the control of engine intake pressure and the cam for controlling the operation of the servo-motor in order to effect such movement of the throttle valve as to maintain a selected pressure, means operated by the manually operated member for adjusting the pressure selecting cam, a second manually operable member and means operated thereby for causing a movement of the cam to change the pressure selection while the setting of the first manually operable member remains fixed.

8. Apparatus for controlling the power output of a supercharged internal combustion engine comprising a throttle valve for controlling the engine fuel intake, a manually operable member for operating the throttle valve, a servo-motor for operating the throttle valve, a pressure selecting cam, means under the control of engine intake pressure and the cam for controlling the operation of the servo-motor in order to effect such movement of the throttle valve as to maintain a selected pressure, means operated by the manually operated member for adjusting the pressure selecting cam, a second manually operable member, means operable thereby, when the first manually operable member is located in a position within a certain range above the lowest pressure selecting position thereof, for causing a movement of the cam to modify the pressure selection while the setting of the first manually operable member remains unchanged and means operated by movement of the first manually operable member to a certain low pressure selecting position for nullifying the effect of the modifying means, while the modifying position of the second manually operable member remains fixed.

9. Apparatus for controlling the power output of a supercharged internal combustion engine comprising a throttle valve for controlling the engine fuel intake, a manually operable member for operating the throttle valve, a servo-motor for operating the throttle valve, a pressure selecting cam, means under the control of engine intake pressure and the cam for controlling the operation of the servo-motor in order to effect such movement of the throttle valve as to maintain a selected pressure, means operated by the manually operated member for adjusting the pressure selecting cam, a second manually operable member, means operable thereby, when the first manually operable member is located in a position within a certain range below the highest pressure selecting position thereof, for causing a movement of the cam to modify the pressure selection while the setting of the first manually operable member remains unchanged and means operable by movement of the first manually operable member to a certain high pressure selecting position for nullifying the effect of the modifying means while the modifying position of the second manually operable member remains fixed.

10. Apparatus for controlling the power output of a supercharged internal combustion engine comprising a throttle valve for controlling the engine fuel intake, a manually operable member for operating the throttle valve, a servo-motor for operating the throttle valve, a pressure selecting cam, means under the control of engine intake pressure and the cam for controlling the operation of the servo-motor in order to effect such movement of the throttle valve as to maintain a selected pressure, means operated by the manually operated member for adjusting the pressure selecting cam, a second manually operable member, means operable thereby, when the first manually operable member is located in a position within a range intermediate the two extremes of its pressure selecting positions, for causing a movement of the cam to modify the pressure selection while the setting of the first manually operable member remains unchanged and means actuated by movement of the first manually operable member either to a certain low pressure selecting position or to a certain high pressure selecting position for nullifying the effect of the modifying means while the modifying position of the second manually operable member remains fixed.

11. Apparatus for controlling the power output of an internal combustion engine comprising a control member, means controlled thereby for variably regulating the manifold pressure and means for variably regulating the engine speed to maintain a definite schedule of power output, means for modifying said definite power output schedule by modifying the action of one of the means which are controlled by said control member, independently of said control member and means for rendering the modifying means ineffective whenever the control member is moved to one of its limits of movement.

12. Mechanism for controlling the intake pressure of a supercharged internal combustion engine comprising a throttle valve which directly controls said intake pressure as the valve is moved to different positions, a control member for determining a pressure to be maintained, automatic means for positioning the valve to maintain the pressure determined by the setting of said control member including a fluid operated servo-motor for moving the valve, a passage for conveying fluid under pressure to said servo-motor, a second passage for by-passing some of the fluid under pressure around said servo-motor and a temperature responsive valve in said by-pass passage to variably restrict said passage in accordance with variations in temperature.

13. Apparatus for controlling the power output of an internal combustion engine comprising an adjustable control member, means operated by the control member for selecting different manifold pressures, automatic means for maintaining whatever pressure is selected, means also operated by the control member to variably regulate the engine speed in order to maintain a definite power output schedule, and means for varying such schedule by changing the position of the pressure selecting means so as to cause a different manifold pressure to be maintained, said last named means being operable independently of the control member and of the speed regulating means.

14. Apparatus for controlling the power output of an internal combustion engine comprising an adjustable control member, means operated by the control member for selecting different manifold pressures, automatic means for maintaining whatever pressure is selected, means also operated by the control member to variably regulate the engine speed in order to maintain a definite power output schedule, and means for varying such schedule by changing the position of the pressure selecting means so as to cause a different manifold pressure to be maintained, without changing the setting of either the control member or the means for regulating engine speed.

15. Apparatus for controlling the power output of an internal combustion engine comprising an adjustable control member, an element positioned by the control member for selecting different manifold pressures to be maintained, means for automatically maintaining whatever pressure is selected by said element, a second element positioned by the control member for variably regulating engine speed, said elements being set in position by the control member to maintain some desired definite power output schedule and means for modifying such power output schedule by changing the position of the pressure selecting element so as to cause a different manifold pressure to be obtained without changing the setting of the control member or said second element.

16. Apparatus for controlling the power output of a supercharged internal combustion engine comprising, in combination, a manually operated control member, an element operable thereby for selecting different manifold pressures, automatic means for maintaining any selected pressure, a second element operable by the control member to regulate engine speed, said first and second elements being positioned by the control member to control the power output of the engine according to some predetermined schedule, and a second control means operable during operation of the engine and independently of said manually operable member and speed regulating element for changing the position of the pressure selecting element in order to effect a change in the power output.

17. Apparatus for controlling the power output of a supercharged internal combustion engine comprising, in combination, a manually operated control member, an element operable thereby for selecting different manifold pressures, automatic means for maintaining any selected pressure, a second element operable by the control member to regulate engine speed, said first and second elements being positioned by the control member to control the power output of the engine according to some predetermined schedule, and a second manually operable member operable to change the position of the pressure selecting element to modify the pressure selection and change the power output schedule while the setting of the first manually operable member and the speed regulating means remains unchanged.

18. Apparatus for controlling the power output of a supercharged internal combustion engine comprising a throttle valve for controlling the engine fuel intake, a manually operable member for operating the throttle valve, means responsive to fuel intake pressure for so operating the throttle valve as to maintain a selected pressure, an element operated by the manually operated member for selecting the pressure to be maintained, a second element operated by the manually operated member for determining the governed engine speed in predetermined relation to pressure selection whereby adjustment of the manually operable member controls both the pressure and speed factors of engine power output according to a predetermined schedule, a second manually operable member and means operated thereby for changing the position of the pressure selecting element while the position of the speed regulating means and the first manually operable member remains unchanged.

19. Apparatus for controlling the power output of a supercharged internal combustion engine comprising a throttle valve for controlling the engine fuel intake, a manually operable member for operating the throttle valve, means responsive to fuel intake pressure for so operating the throttle valve as to maintain a selected pressure, an element operated by the manually operated member for selecting the pressure to be maintained, a second element operated by the manually operated member for determining the governed engine speed in predetermined relation to pressure selection whereby adjustment of the manually operable member controls both the pressure and speed factors of engine power output according to a predetermined schedule, a second manually operable member and means operated thereby for changing the position of the pressure selecting element while the position of the first manually operable member, the speed regulating means and the throttle remains unchanged.

JOHN DOLZA.
DONALD P. CROISANT.
ARTHUR W. GAUBATZ.
PETER W. PERISH.

REFERENCES CITED

The following references are of record in the file of this patent:

UNITED STATES PATENTS

| Number | Name | Date |
| --- | --- | --- |
| 1,951,927 | Dodson | Mar. 20, 1934 |
| 1,183,225 | Gregg | Dec. 4, 1934 |
| 1,998,362 | Dodson | Apr. 16, 1935 |
| 2,088,954 | Gregg | Aug. 3, 1937 |
| 2,115,485 | Dodson | Apr. 26, 1938 |
| 2,205,354 | Gregg et al. | June 18, 1940 |
| 2,217,364 | Halford et al. | Oct. 8, 1940 |
| 2,233,319 | Lozivit | Feb. 25, 1941 |
| 2,285,344 | Marples et al. | June 2, 1942 |
| 2,305,070 | Butler et al. | Dec. 15, 1942 |

FOREIGN PATENTS

| Number | Country | Date |
| --- | --- | --- |
| 482,596 | Great Britain | Apr. 1, 1938 |